United States Patent

Holtrup et al.

(10) Patent No.: US 6,703,428 B1
(45) Date of Patent: Mar. 9, 2004

(54) AROMATIC ALDEHYDE RESINS AND THEIR USE AS EMULSION BREAKERS

(75) Inventors: Frank Holtrup, Burgkirchen (DE);
Tanja Schönstetter, Burgkirchen (DE);
Heidi Grundner, Garching/Alz (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/549,016

(22) Filed: Apr. 14, 2000

(30) Foreign Application Priority Data

Apr. 15, 1999 (DE) ......................... 199 16 945

(51) Int. Cl.$^7$ ............................. B01D 17/05
(52) U.S. Cl. .................. 516/173; 516/179; 210/708
(58) Field of Search ............... 516/173, 179; 525/509, 526; 528/266, 269, 230, 270; 564/331; 210/708

(56) References Cited

U.S. PATENT DOCUMENTS

| | | | | |
|---|---|---|---|---|
| 2,683,730 A | * | 7/1954 | Seeger et al. ............. | 564/331 |
| 2,743,255 A | * | 4/1956 | De Groote ............... | 564/331 |
| 2,950,263 A | * | 8/1960 | Abbotson et al. ......... | 528/80 |
| 3,065,206 A | * | 11/1962 | Chamot .................. | 528/269 |
| 3,186,969 A | * | 6/1965 | Cox et al. ............... | 525/507 |
| 3,245,924 A | * | 4/1966 | Cox et al. ............... | 564/331 |
| 3,423,344 A | * | 1/1969 | Odinak et al. ........... | 564/331 |
| 3,830,850 A | | 8/1974 | Stratton ................. | 568/609 |
| 4,032,514 A | | 6/1977 | Buriks et al. ........... | 516/183 |
| 4,117,031 A | | 9/1978 | Macenka et al. ......... | 516/183 |
| 4,431,565 A | | 2/1984 | Billenstein et al. ...... | 516/183 |

FOREIGN PATENT DOCUMENTS

| | | |
|---|---|---|
| DE | 1 060 140 | 8/1957 |
| DE | 24 45 873 | 4/1976 |
| EP | 0 078 975 | 5/1983 |

OTHER PUBLICATIONS

EPO Search Report, Mar. 2001, EP 00 10 6610.

* cited by examiner

Primary Examiner—Daniel S. Metzmaier
(74) Attorney, Agent, or Firm—Susan S. Jackson; Scott E. Hanf

(57) ABSTRACT

Resins obtainable from compounds of formula 1

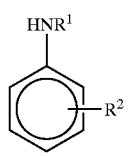

(1)

in which the substituents $R^2$ and $HNR^1$ can be in the ortho, meta or para position relative to one another, and $R^1$ has the same meaning as $R^2$, or has the meaning —$COR^2$, where $R^1$ is independent of $R^2$, $R^2$ is $C_1$–$C_{30}$-alkyl, $C_2$–$C_{30}$-alkenyl, $C_6$–$C_{18}$-aryl, $C_7$–$C_{30}$-alkylaryl, by the steps, which can be carried out in any order, of A) reaction with an aldehyde of the formula 2

$$R^3\text{—CHO} \quad (2),$$

wherein $R^3$ is H, $C_1$–$C_{30}$-alkyl, $C_2$–$C_{30}$-alkenyl, $C_6$–$C_{18}$-aryl or $C_7$–$C_{30}$-alkylaryl, and B) alkoxylation with a $C_2$–$C_4$-alkylene oxide in molar excess, such that the resulting alkoxylate has a degree of alkoxylation of from 1 to 100 alkylene oxide units per —NH group, and the resin has a molecular weight of from 250 to 100,000 units, and their use as emulsion breakers.

1 Claim, No Drawings

AROMATIC ALDEHYDE RESINS AND THEIR USE AS EMULSION BREAKERS

BACKGROUND OF THE INVENTION

The present invention relates to resins preparable from aromatic compounds by condensation with aldehydes, and to their use for breaking water-oil emulsions, in particular in the production of crude oil.

During its recovery, crude oil is produced as an emulsion with water. Before the crude oil is further processed, these crude oil emulsions must be broken into the oil and water constituents. For this purpose, use is generally made of crude oil breakers. Crude oil breakers are surface-active compounds which are able to effect the required separation of the emulsion constituents within a short time.

Crude oil breakers include alkylphenol aldehyde resins, which are disclosed, for example, in U.S. Pat. No. 4,032,514. These resins are obtainable from the condensation of a p-alkylphenol with an aldehyde, in most cases formaldehyde. The resins are often used in alkoxylated form, as is disclosed, for example, in DE-A-24 45 873. For this, the free phenolic OH groups are reacted with an alkylene oxide.

SUMMARY OF THE INVENTION

However, alkylphenol aldehyde resins have recently become the subject of criticism because of their virtually unavoidable content of free alkylphenols and alkylphenol alkoxylates. According to the current state of knowledge, it cannot be ruled out that alkylphenols and alkylphenol alkoxylates have estrogenic action, which would be a potential threat to the animal kingdom.

The object was therefore to find new crude oil breakers which are at least comparable with the alkylphenol aldehyde resins in activity, but which do not comprise alkylphenols or alkylphenol alkoxylates, and are therefore not suspected of having estrogenic action.

Surprisingly, we have found that resins which can be prepared from N-substituted alkylaminobenzenes exhibit excellent action as crude oil breakers and are not suspected of having a hormone-like action.

DESCRIPTION OF THE PREFERRED EMBODIMENTS

The invention thus provides resins obtainable from compounds of the formula 1

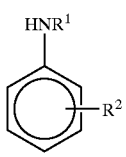

(1)

in which the substituents $R^2$ and $HNR^1$ can be in the ortho, meta or para position relative to one another, and $R^1$ has the same meaning as $R^2$, or has the meaning —$COR^2$, where $R^1$ is independent of $R^2$, $R^2$ is $C_1$–$C_{30}$-alkyl, $C_2$–$C_{30}$-alkenyl, $C_6$–$C_{18}$-aryl, $C_7$–$C_{30}$-alkylaryl, by the steps, which can be carried out in any order, of A) reaction with an aldehyde of the formula 2

$$R^3\text{—CHO} \qquad (2),$$

wherein $R^3$ is H, $C_1$–$C_{30}$-alkyl, $C_2$–$C_{30}$-alkenyl, $C_6$–$C_{18}$-aryl or $C_7$–$C_{30}$-alkylaryl, and B) alkoxylation with a $C_2$–$C_4$-alkylene oxide in molar excess, such that the resulting alkoxylate has a degree of alkoxylation of from 1 to 100 alkylene oxide units per —NH group, and the resin has a molecular weight of from 250 to 100,000 units.

The compounds of the formula (1) are essentially chemically homogeneous compounds which are not used in mixtures with one another. The term "essentially" means here that, for the preparation of the resins according to the invention, compounds of the formula (1) are used in commercially available purity. Proportions of other compounds covered by formula (1) can therefore be present in the resins, it being necessary, in particular, to draw attention to proportions of the two other aromatic substitution isomers in each case which have not been completely removed. The same is true for the aldehyde used for the condensation. This too is essentially to be used as a homogeneous substance, where aldehydes of commercially available purity are used.

$R^1$ is preferably a —$COR^2$ radical in which $R^2$ is $C_1$–$C_{18}$-, in particular $C_2$–$C_{14}$-, especially $C_4$–$C_{12}$-alkyl or -alkenyl.

If one of the radicals $R^1$, $R^2$ or $R^3$ is an alkenyl or alkyl radical, then its chain length is preferably from 2 to 24, particularly preferably from 4 to 22, especially from 4 to 18, carbon atoms. Alkyl and alkenyl radicals can either be linear or branched.

If one of the radicals $R^1$, $R^2$ or $R^3$ is an alkylaryl radical, then alkylaryl is preferably a radical bonded via the aromatic ring, whose aromatic ring preferably includes 6 carbon atoms, and which carries, in the o-, m- or p-position relative to the abovementioned bond, an alkyl radical having a chain length of preferably from 1 to 18, particularly preferably from 4 to 16, in particular from 6 to 12, carbon atoms.

If step A is carried out first and then step B, the compounds of the formula 1 are then reacted with aldehydes of the formula 2 to give a resin. The aldehydes of the formula 2 are preferably those in which $R^8$ is H or a $C_1$–$C_6$-alkyl radical, in particular H or a $C_1$–$C_4$-alkyl radical. In a particularly preferred embodiment, $R^8$ is hydrogen. The condensation can either be acid-catalyzed or base-catalyzed. The resins resulting from the condensation are then alkoxylated with a $C_2$–$C_4$-alkylene oxide, preferably ethylene oxide or propylene oxide. The alkoxylating agent is used in molar excess. The alkoxylation takes place on the free NH groups of the resulting resin. Alkylene oxide is used in an amount such that the average degree of alkoxylation is between 1 and 100 alkylene oxide units per free NH group. The term "average degree of alkoxylation" here means the average number of alkoxy units which are attached to each free NH group. It is preferably from 1 to 70, in particular from 2 to 50.

Steps A) (condensation) and B) (alkoxylation) are preferably carried out in this order. It is, however, also possible to carry them out in reverse order. In this case, the compounds of the formula 1 are firstly alkoxylated, and then converted into the resin.

The resin obtained after condensation and alkoxylation preferably has a molecular weight of from 500 to 50,000 units, in particular from 1000 to 10,000 units.

Preferred resins which are obtainable by the described process have the following structures:

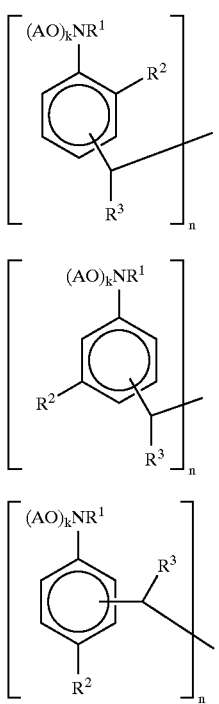

$(AO)_k NR^1$ is the alkoxylated $NHR^1$ radical, in which AO is the alkylene oxide unit, and k is the degree of alkoxylation. The bridging of the aromatic rings via the carbon atom carrying the radical $R^3$ can join onto any of the free positions of the aromatic rings. n is the degree of condensation of the resin. n is preferably a number from 2 to about 100, in particular from 3 to 50, particularly preferably from 4 to 30, especially from 4 to 10.

The invention further provides for the use of the resins according to the invention for breaking oil-water emulsions.

For use as crude oil breakers, the resins are added to the water-oil emulsions, which preferably takes place in solution. Preferred solvents are paraffinic or aromatic solvents. The amounts are from 0.0001 to 5% by weight, preferably from 0.0005 to 2% by weight, in particular from 0.0008 to 1 and especially from 0.001 to 0.1% by weight, of resin based on the oil content of the emulsion to be broken.

The compounds according to the invention are generally prepared by acid- or alkali-catalyzed condensation of the compounds of the formula 1 with the aldehydes of the formula 6, where the alkoxylation can precede or follow the condensation. The reaction temperature is generally between 50 and 170° C., preferably from 120 to 165° C. The reaction is normally carried out at atmospheric pressure. Examples of catalyzing acids which may be mentioned are HCl, $H_2SO_4$, sulfonic acids or $H_3PO_4$, and bases which may be mentioned are NaOH, KOH or triethylamine, which are used in amounts of from 0.1 to 50% by weight, based on the weight of the reaction mixture. The condensation generally requires from 30 min to 6 hours. The molar ratio between aldehyde and aromatic compound is generally from 0.5:1 to 4:1, preferably from 0.8:1 to 1.8:1.

The alkoxylation is carried out, as is known from the prior art, by reacting the resins with an alkylene oxide under an increased pressure of generally from 1.1 to 20 bar at temperatures of from 50 to 200° C.

EXAMPLES

Example 1

Reaction of p-Butyl-N-methylaniline With Formaldehyde (Acidic Catalysis)

A 500 ml four-necked flask fitted with contact thermometer, stirrer, dropping funnel and water separator was charged with 60.0 g of p-butyl-N-methylaniline (M=163), 60 ml of an aromatic solvent and 0.6 g of alkylbenzenesulfonic acid (0.5 mol %). With stirring and nitrogen blanketing, the reaction mixture was heated to 120° C., and at this temperature 31.6 g of aqueous formaldehyde solution (35% strength) were slowly added dropwise. When the addition was complete, the mixture was stirred for one hour at 120° C. and for one hour at 165° C., and the water of reaction which formed was removed via the separator. The product was evaporated to dryness on a rotary evaporator (yield: 54.2 g) and analyzed using GPC.

Example 2

Reaction of p-Butyl-N-methylaniline With Formaldehyde (Alkaline Catalysis)

A 500 ml four-necked flask fitted with contact thermometer, stirrer, dropping funnel and water separator was charged with 54.0 g of p-butyl-N-methylaniline (M=163), 50 g of an aromatic solvent and 0.8 g of 40% strength potassium hydroxide solution. With stirring and nitrogen blanketing, the reaction mixture was heated to 120° C., and at this temperature 28.5 g of aqueous formaldehyde solution (35% strength) were slowly metered in. When the addition was complete, the mixture was stirred for one hour at 120° C. and for a further hour at 165° C., and the water of reaction which formed was removed via the separator. The product was evaporated to dryness on a rotary evaporator (yield: 52.0 g) and analyzed using GPC.

Example 3

Reaction of p-Dodecyl-N-acetylaniline With Formaldehyde

In a 500 ml stirred flask fitted with contact thermometer, stirrer, dropping funnel and water separator, 97.0 g of p-dodecyl-N-acetylaniline (M=303) and 0.5 g of alkylbenzenesulfonic acid (0.5 mol %) were dissolved in 100 g of an aromatic solvent. With stirring and nitrogen blanketing, the reaction mixture was heated to 120° C. At 120° C., 27.4 g of formaldehyde solution (35% strength in water) was slowly added dropwise. When the addition was complete, the mixture was left to post-react for one hour at 120° C. and for one hour at 165° C. The water of reaction which formed in the process was removed via the separator. The product was evaporated to dryness on a rotary evaporator (yield: 92.0 g) and analyzed using GPC.

Example 4

Reaction of p-Hexyl-N-tritylaniline With Formaldehyde (Alkaline Catalysis)

In a 500 ml stirred flask fitted with contact thermometer, stirrer, dropping funnel and water separator, 80.0 g of p-hexyl-N-tritylaniline (M=419, trityl=triphenylmethyl) and 1.1 g of 40% strength potassium hydroxide solution were dissolved in 80 g of an aromatic solvent. Then, with stirring and nitrogen blanketing, the reaction mixture was heated to 120° C., and at this temperature 16.4 g of formaldehyde solution (35% strength in water) were slowly added dropwise. After the addition was complete, the mixture was left to post-react for one hour at 120° C. and for one hour at 165° C. The water of reaction which formed in the process was removed via the separator. The product was evaporated to dryness on a rotary evaporator (yield: 66.0 g) and analyzed using GPC.

Alkoxylation of the Aromatic Aldehyde Resins
Ethylene Oxide

The resins described above were placed in a 1 l glass autoclave and the pressure in the autoclave was adjusted to a pressure of about 0.2 bar above atmospheric pressure with nitrogen. The system was heated slowly to 140° C. and after this temperature had been achieved the pressure was again adjusted to a pressure of 0.2 bar above atmospheric pressure.

Then, at 140° C., the desired amount of EO was metered in, the pressure not being allowed to exceed 4.5 bar. After the addition of EO was complete, the mixture was left to post-react for a further 30 minutes at 140° C.

Propylene Oxide

The resins described above were placed in a 1 l glass autoclave and the pressure in the autoclave was adjusted to a pressure of about 0.2 bar above atmospheric pressure with nitrogen. The system was heated slowly to 130° C. and after this temperature had been achieved the pressure was again adjusted to a pressure of 0.2 bar above atmospheric pressure.

Then, at 130° C., the desired amount of PO was metered in, the pressure not being allowed to exceed 4.0 bar. After the addition of PO was complete, the mixture was left to post-react for a further 30 minutes at 130° C.

Determination of the Breaking Effectiveness of Crude Oil Emulsion Breakers

To determine the effectiveness of an emulsion breaker, the water separation from a crude oil emulsion per time, and the dewatering and desalting of the oil were determined. For this, demulsifying glasses (tapered, graduated glass flasks with screw lids) were charged in each case with 100 ml of the crude oil emulsion, a defined amount of the emulsion breaker was in each case metered in just below the surface of the oil emulsion using a micropipette, and the breaker was mixed into the emulsion by vigorous shaking. The demulsifying glasses were then placed in a conditioning bath (30° C. and 50° C.) and water separation was monitored.

During emulsion breaking and after it was complete, samples were taken from the oil from the upper section of the demulsifying glass (so-called top oil), and the water content was determined in accordance with the Karl Fischer method and the salt content was determined conductometrically. In this way, it was possible to assess the novel breakers following water separation, and dewatering and desalting of the oil.

Breaking Action of the Breakers Described

Source of the crude oil emulsion: Holzkirchen sonde 3, Germany
Water content of the emulsion: 46%
Salt content of the emulsion: 5%
Demulsification temperature: 50° C.
Amount added: 100 ppm

| Water separation [ml] per time [min] | 5 | 10 | 20 | 30 | 45 | 60 | 90 | 120 | 180 | Water in the top oil [%] | Salt in the top oil [ppm] |
|---|---|---|---|---|---|---|---|---|---|---|---|
| Example 1 | 1 | 3 | 17 | 30 | 37 | 41 | 43 | 45 | 46 | 0.55 | 110 |
| Example 2 | 1 | 3 | 15 | 27 | 35 | 39 | 41 | 44 | 46 | 0.60 | 117 |
| Example 3 | 2 | 5 | 26 | 31 | 36 | 40 | 44 | 46 | 46 | 0.44 | 102 |
| Example 4 | 2 | 7 | 30 | 35 | 40 | 44 | 46 | 46 | 46 | 0.37 | 89 |
| Control | 0 | 0 | 0 | 0 | 0 | 0 | 0 | 0 | 0 | n.m. | >10000 |

What is claimed is:

1. A method of using a resin obtained from a compound of formula (1)

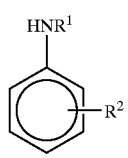

(1)

in which the substituents R2 and $HNR^1$ can be in the ortho, meta or para position relative to one another, and $R^1$ has the same meaning as $R^2$, or has the meaning $-COR^2$, where $R^1$ is independent of $R^2$, $R^2$ is $C_1-C_{30}$-alkyl, $C_2-C_{30}$-alkenyl, $C_6-C_{18}$-aryl, $C_7-C_{30}$-alkylaryl, by the steps, which can be carried out in any order, of A) reaction with an aldehyde of the formula (2)

$R^3-CHO$ (2), wherein $R^3$ is H, $C_1-C_{30}$-alkyl, $C_2-C_{30}$-alkenyl, $C_6-C_{18}$-aryl or $C_7-C_{30}$-alkylaryl, and B) alkoxylation with a $C_2-C_4$-alkylene oxide in molar excess, such that the resulting alkoxylate has a degree of alkoxylation of from 1 to 100 alkylene oxide units per $-NH$ group, and the resin has a molecular weight of from 250 to 100,000 units;

the method comprising adding the resin as a crude oil breaker to an oil-water emulsion.